US008655555B2

(12) United States Patent
Ono et al.

(10) Patent No.: US 8,655,555 B2
(45) Date of Patent: Feb. 18, 2014

(54) OPENABLE AND CLOSABLE MEMBER CONTROL APPARATUS AND VEHICLE HAVING THE SAME

(75) Inventors: Hiromichi Ono, Hamamatsu (JP); Takahiro Sumiya, Toyohashi (JP); Shinichiro Noda, Nagoya (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 115 days.

(21) Appl. No.: 13/368,617

(22) Filed: Feb. 8, 2012

(65) Prior Publication Data

US 2012/0209477 A1 Aug. 16, 2012

(30) Foreign Application Priority Data

Feb. 10, 2011 (JP) .................................. 2011-27003

(51) Int. Cl.
*B60R 22/00* (2006.01)

(52) U.S. Cl.
USPC ............................................ 701/49; 318/632

(58) Field of Classification Search
USPC ...................................... 701/50, 49; 318/632
See application file for complete search history.

(56) References Cited

U.S. PATENT DOCUMENTS

| | | | | |
|---|---|---|---|---|
| 4,870,333 | A | 9/1989 | Itoh et al. | |
| 5,436,539 | A * | 7/1995 | Wrenbeck et al. | 318/265 |
| 5,530,329 | A * | 6/1996 | Shigematsu et al. | 318/469 |
| 6,051,945 | A * | 4/2000 | Furukawa | 318/280 |
| 7,535,347 | B2 * | 5/2009 | Larson et al. | 340/457.4 |
| 2005/0083003 | A1 * | 4/2005 | Mochizuki et al. | 318/452 |
| 2008/0234894 | A1 * | 9/2008 | Nomura et al. | 701/36 |
| 2009/0055339 | A1 * | 2/2009 | Bernard | 706/46 |

FOREIGN PATENT DOCUMENTS

| | | |
|---|---|---|
| JP | A-8-158738 | 6/1996 |
| JP | A-2010-24646 | 2/2010 |

* cited by examiner

*Primary Examiner* — Behrang Badii
*Assistant Examiner* — Daniel L Greene
(74) *Attorney, Agent, or Firm* — Posz Law Group, PLC

(57) ABSTRACT

A computing device computes at least one index value for an execution history of opening/closing movement of an openable and closable member. A sensing device outputs signals one after another in response to a change in a rotational state of the electric motor, which is sensed by the sensing device. A setting device sets a masking range for at least one of the signals based on the at least one index value. A determination device determines whether an object is pinched by the openable and closable member based on at least another one of the signals, which is outputted in a range other than the masking range, without referring to the at least one of the signals in the masking range during execution of the opening/closing movement of the openable and closable member.

6 Claims, 7 Drawing Sheets

| NUMBER OF EXECUTIONS | MASKING RANGE |
|---|---|
| 1-100 | B1 |
| 101-200 | B2 |
| 201-300 | B3 |
| 301-400 | B4 |
| ⋮ | ⋮ |

OPENABLE AND CLOSABLE MEMBER CONTROL APPARATUS AND VEHICLE HAVING THE SAME

CROSS REFERENCE TO RELATED APPLICATION

This application is based on and incorporates herein by reference Japanese Patent Application No. 2011-27003 filed on Feb. 10, 2011.

TECHNICAL FIELD

The present disclosure relates to a closable and openable member control apparatus and a vehicle having the same.

BACKGROUND

In a known openable and closable member control apparatus, an openable and closable member (e.g., a glass window panel, a slide door, a slide roof panel) of a vehicle is driven to open or close the same with a drive force of, for example, an electric motor. In this openable and closable member control apparatus, an object (foreign object), such as a human body, may possibly be pinched by the openable and closable member at the time of moving the openable and closable member. In order to limit the pinching of the object by the openable and closable member, for instance, JPS63-165682A (U.S. Pat. No. 4,870,333), JPH08-158738A and JP2010-24646A propose an openable and closable member control apparatus, which stops or reverses a moving direction of the openable and closable member in a state where pinching of the object by the openable and closable member is sensed.

Specifically, according to the technique of JPS63-165682A (U.S. Pat. No. 4,870,333), when a degree of speed reduction in a rotational speed of the motor, which drives a glass window panel, exceeds a threshold value, it is determined that an object is pinched by the window panel. Furthermore, in order to limit an occurrence of erroneous pinching determination at the time of starting rotation of the motor, at which the rotational speed of the motor becomes unstable, a mask is applied to limit execution of the process of determining whether the object is pinched by the window panel until elapse of a predetermined time period after the starting of the rotation of the motor.

However, the rotational speed of the motor may possibly be decreased due to a change in a viscosity of grease in the motor caused by a change in the temperature, a change in a voltage of a battery, and/or a change caused by aging of the corresponding component(s). Furthermore, in a power window control apparatus of a wire type, which uses a flexible member (e.g., a wire) as a drive force transmitting element that transmits a drive force from the motor to the window panel, an unstable range of the rotational speed of the motor, in which the rotational speed of the motor is unstable, varies between a case of executing closing movement of the window panel after execution of closing movement thereof and a case of executing closing movement of the window panel after execution of opening movement thereof due to a change in a location of slackness in the flexible member. In order to limit the occurrence of the erroneous pinching determination caused by the change in the rotational speed of the motor discussed above, a masking time period for masking the unstable range after the starting of rotation of the motor is lengthened. However, in such a case, the timing of executing the process of determining whether the object is pinched by the window panel may possibly be delayed, thereby resulting in an increase in a pinching force applied from the window panel to the pinched object.

In contrast, in the openable and closable member control apparatus of JPH08-158738A, which opens or closes the window panel through the flexible member, a masking value of a masking range is set in view of a state of slackness of the flexible member, which varies depending on a moving pattern of the window panel. Furthermore, a rotational angle of the motor is used as the masking value in the process of determining whether the object is pinched by the window panel. In this way, the process of determining whether the object is pinched by the window panel can be made in view of the various factors, which cause the change in the rotational speed of the motor. However, in the technique of JPH08-158738A, a change in a size (dimension) of the flexible member caused by the aging of the flexible member is not taken into account in the computation of the masking value. Therefore, the change in the masking value caused by the aging of the flexible member cannot be compensated. As a result, the masking value may possibly deviate from an appropriate range by a long term use of the flexible member.

In view of the above points, in the openable and closable member control apparatus of JP2010-24646A, the rotational amount of the motor from an upper limit position of the openable and closable member (a position of the openable and closable member, at which the openable and closable member is fully closed) to a lower limit position of the openable and closable member (a position of the openable and closable member, at which the openable and closable member is fully opened) is compared with a predetermined reference value to compute the correction amount of the masking value. Specifically, according to the technique of JP2010-24646A, it is assumed that a change in the rotational amount of the motor, which is measured at the time of moving the openable and closable member through an entire movable range thereof, varies depending on the aging of the flexible member. Thus, the rotational amount of the motor, which is measured at the time of moving the openable and closable member through the entire movable range thereof, is compared with an initial value thereof to compute the correction amount, and thereby the masking value is corrected by the amount, which corresponds to the aging of the flexible member.

However, according to the technique of JP2010-24646A, the correction amount of the masking value is not computed unless the openable and closable member is moved through the entire movable range thereof. Therefore, depending on the moving pattern of the openable and closable member (e.g., repeating of opening/closing movement of the openable and closable member, which stops the openable and closable member in the middle of the movable range of the openable and closable member), the masking value may not be corrected even in the state where the size of the flexible member is changed due to the aging thereof. As a result, the masking value may possibly be deviated from its appropriate range through the long term use of the flexible member.

In order to eliminate the change in the appropriate masking value caused by the change in the size of the flexible member, an automatic tensioner mechanism, which always applies a predetermined tension to the flexible member through, for example, a roller connected to a spring, may possibly be installed to automatically correct the slackness of the flexible member. However, in such a case, the number of components and costs are unavoidably increased due to the installation of the automatic tensioner.

SUMMARY

According to the present disclosure, there is provided an openable and closable member control apparatus, which includes a flexible drive member, an electric motor, a sensing device, a computing device, a setting device and a determination device. The flexible drive member is engaged with an openable and closable member and drives the openable and closable member to open or close the openable and closable member through opening/closing movement of the openable and closable member. The electric motor applies a drive force to the flexible drive member. The sensing device outputs signals one after another in response to a change in a rotational state of the electric motor, which is sensed by the sensing device. The computing device computes at least one index value for an execution history of the opening/closing movement of the openable and closable member. The setting device sets a masking range for at least one of the signals based on the at least one index value. The determination device determines whether an object is pinched by the openable and closable member based on at least another one of the signals, which is outputted in a range other than the masking range, without referring to the at least one of the signals in the masking range during execution of the opening/closing movement of the openable and closable member.

Furthermore, there is also disclosed a vehicle, which includes a vehicle main body, the above-described openable and closable member and the above-described openable and closable member control apparatus.

BRIEF DESCRIPTION OF THE DRAWINGS

The drawings described herein are for illustration purposes only and are not intended to limit the scope of the present disclosure in any way.

DETAILED DESCRIPTION

An embodiment of the present disclosure will be described.

Figure 1:
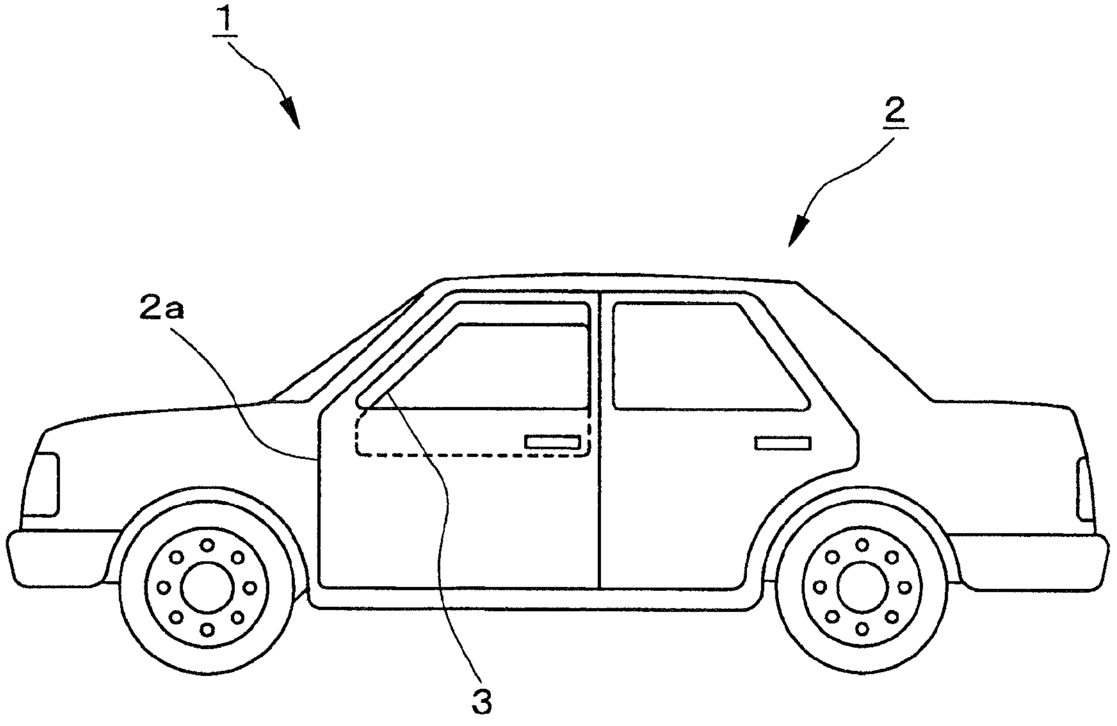
FIG. 1 is a side view of a vehicle according to an embodiment of the present disclosure.
Figure 2:
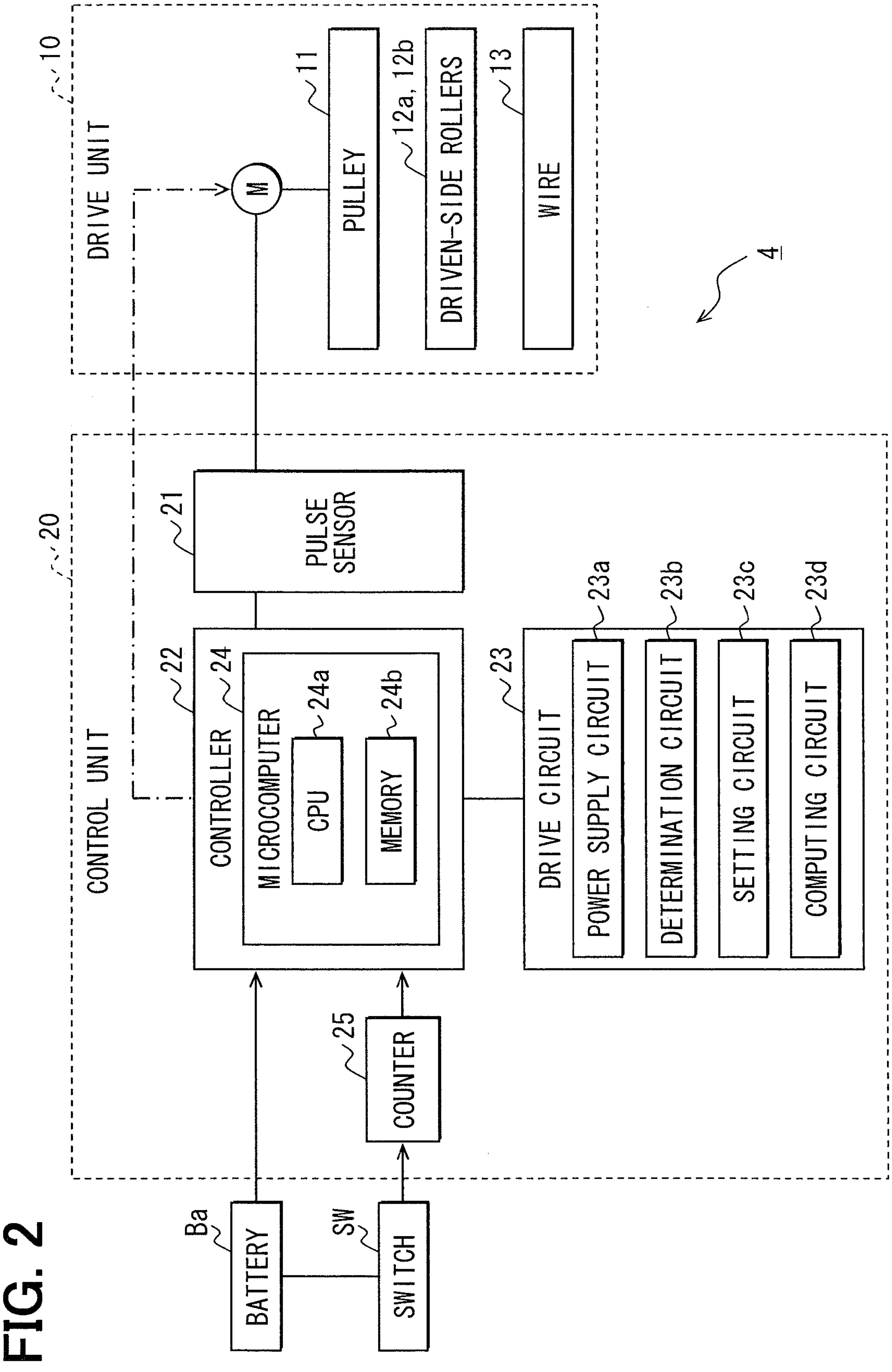
FIG. 2 is a diagram showing a structure of a power window control apparatus of the embodiment, which serves as an openable and closable member control apparatus.
Figure 3:
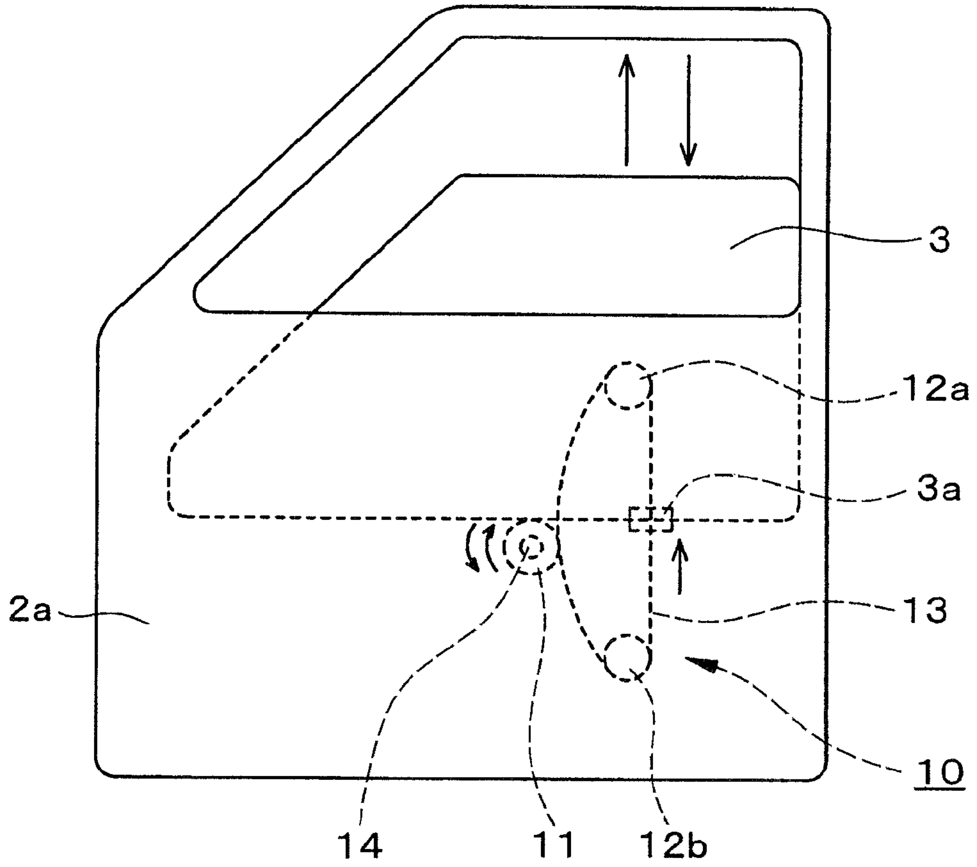
FIG. 3 is a side view of a door of the vehicle of the embodiment.

A vehicle 1 of the present embodiment will be described with reference to FIGS. 1 to 3. FIG. 1 is a side view of the vehicle 1 of the present embodiment. FIG. 2 is a diagram showing a structure of a power window control apparatus 4 of the present embodiment. FIG. 3 is a side view of a door 2*a* of the vehicle 1 of the present embodiment.

With reference to FIG. 1, the vehicle 1 of the present embodiment includes a vehicle main body 2 and a glass window panel (or simply referred to as a window glass) 3. The vehicle main body 2 is a portion of the vehicle 1, which is other than the window panel 3 and the power window control apparatus 4. The window panel 3 is an example of the openable and closable member and is installed to the door 2*a* (more specifically, a window frame of the door 2*a*), which is a portion of the vehicle main body 2, in such a manner that the window panel 3 can be opened or closed through the opening/closing movement thereof relative to the door 2*a*, i.e., the window panel 3 is openable and closable relative to the door 2*a*. In the present embodiment, the window panel 3 is driven to execute the opening/closing movement thereof in the vertical direction of the vehicle main body 2. Furthermore, the opening/closing movement of the window panel 3 refers to movement of the window panel 3 in an opening direction or a closing direction thereof and is made at the time of opening or closing the window panel 3 relative to a window of the door 2*a* (more specifically, the window frame of the door 2*a*).

Furthermore, the vehicle 1 has the power window control apparatus 4, which controls the opening/closing movement of the window panel 3. The power window control apparatus 4 is an example of the openable and closable member control apparatus and includes a drive unit 10 and a control unit 20 as main components thereof, as shown in FIG. 2. Now, the drive unit 10 and the control unit 20 will be described.

The drive unit 10 is provided to execute the opening/closing movement of the window panel 3. With reference to FIGS. 2 and 3, the drive unit 10 includes an electric motor M, a pulley 11, two driven-side rollers 12*a*, 12*b* and an endless wire 13, which are installed to the door 2*a*. The pulley 11 is connected to an output shaft 14 of the motor M.

The motor M is a drive source for driving the window panel 3 to execute the opening/closing movement of the window panel 3. In the present embodiment, the motor M provides a drive force to the window panel 3 to drive the same through the pulley 11. For instance, a brushed direct current (DC) motor or a brushless motor may be suitably used as the motor M of the present embodiment.

The pulley 11 is an example of a rotatable roller (driving-side roller) and cooperates with the driven-side rollers 12*a*, 12*b* to rotate, i.e., turn the wire 13. Specifically, the pulley 11 and the driven-side rollers 12*a*, 12*b* are rotated while the wire 13 is coupled with, i.e., is placed around outer peripheral surfaces of the pulley 11 and the driven-side rollers 12*a*, 12*b*. When the motor M is driven to rotate, the pulley 11 and the driven-side rollers 12*a*, 12*b* are rotated together with the wire 13. In other words, the motor M of the present embodiment provides the drive force to the wire 13 by rotating the pulley 11 and the driven-side rollers 12*a*, 12*b*. The wire 13 is wound at least once around the outer peripheral surface of the pulley 11 to limit slip between the wire 13 and the pulley 11.

The wire 13 is an example of a flexible drive member and is rotated to execute the opening/closing movement of the window panel 3. The wire 13 of the present embodiment is wound around the outer peripheral surface of each of the pulley 11 and the driven-side rollers 12*a*, 12*b* and is securely engaged (fixed) to a fixture member 3*a*, which is formed at the window panel 3 at a location between the driven-side rollers 12*a*, 12*b*. In this way, the window panel 3 and the wire 13 are integrally driven to execute the opening/closing movement of the window panel 3 in response to the rotation of the wire 13.

For instance, a steel wire or a resin wire having a high tensile strength may be suitable as a material of the wire 13.

In the drive unit 10 having the above-described structure, when the motor M is driven, the pulley 11 is rotated together with the driven-side rollers 12*a*, 12*b* to rotate the wire 13 in a spanning direction thereof (i.e., a direction of spanning between the driven-side rollers 12*a*, 12*b* with the wire 13) and thereby to execute the opening/closing movement of the window panel 3 in the vertical direction in response to the rotation of the wire 13.

The control unit 20 controls the execution of the opening/closing movement of the window panel 3 (more specifically, the driving operation of the motor M). As shown in FIG. 2, the control unit 20 includes a pulse sensor 21, a controller 22 and a drive circuit 23.

The pulse sensor 21 is an example of a sensing device, which senses a rotational state of the motor M and outputs a pulse signal that is a signal corresponding to the rotational state of the motor M. That is, the pulse sensor 21 outputs pulse signals one after another in response to a change in the rotational state (rotational angle) of the motor M, which is sensed by the sensing device 21. More specifically, the pulse sensor 21 includes a Hall element, a rotary encoder or a resolver and outputs the pulse signal at every predetermined rotational angle upon sensing a rotational speed (more specifically, an angular speed) and a rotational direction of the motor M. The outputted pulse signal is supplied to the controller 22.

In the present embodiment, the rotational speed and the rotational direction of the motor M with respect to the rotational angle of the motor M as well as a drive amount of the wire 13 (a turning amount of the wire 13) at the time of driving the window panel 3 in the opening or closing direction thereof may be computed based on the pulse signal. Furthermore, a location of the window panel 3 in a moving path of the window panel 3 (i.e., a movable range of the window panel 3) may also be specified based on the pulse signal.

A battery Ba (serving as an electric power supplying means) and a switch SW (serving as a manipulating means) are connected to the controller 22. Furthermore, the controller 22 includes a microcomputer 24, which controls the opening or closing of the window panel 3 (the execution of the opening/closing movement of the window panel 3) according to a preinstalled program. The microcomputer 24 includes a central processing unit (CPU) 24*a* and a memory (serving as a storage device) 24*b*. The CPU 24*a* executes computing operations for controlling the opening or closing of the window panel 3. The memory 24*b* stores data, signals and programs. The microcomputer 24 executes predetermined processes based on the signals received from the pulse sensor 21 and controls the motor M through the drive circuit 23.

As shown in FIG. 2, the drive circuit 23 includes various circuits, such as an electric power supply circuit 23*a* that supplies the electric power to the motor M. When the electric power supply circuit 23*a* is operated under the control of the microcomputer 24, the motor M is rotated in one of a normal direction and a reverse direction, which are opposite to each other. The switch SW includes a closing switch and an opening switch and outputs a corresponding signal (e.g., an opening command signal or a closing command signal) in response to manipulation thereof by a user. A counter 25 is connected to the switch SW. The counter 25 counts the number of switching manipulations of the switch SW (i.e., the number of executions of the opening/closing movement of the window panel 3).

Furthermore, the control unit 20 has a function of limiting pinching of an object (foreign object, such as a human body) by temporarily driving the window panel 3 in the opening direction in a case where the object is pinched between the window panel 3 and the door 2*a* during the closing movement of the window panel 3. In the present embodiment, a process (pinching determination process) of determining whether the object is pinched by the window panel 3 is executed through comparison of the rotational speed of the motor M (more specifically, the angular speed of the motor M) with a corresponding threshold value, which is set for the pinching determination. More specifically, when the object is pinched by the window panel 3, the rotational speed of the motor M (more specifically, the angular speed of the motor M) is changed, and thereby an interval between each two successive pulse signals is changed. In view of this phenomenon, according to the present embodiment, a change in the interval between the successive pulse signals is sensed, and the pinching determination process of determining whether the object is pinched by the window panel 3 is executed through the comparison of the change with a predetermined threshold value, which is set for the pinching determination. In the case where it is determined that the object is pinched by the window panel 3 in the pinching determination process, a pinching releasing operation is performed such that the motor M is rotated through a predetermined number of rotations in the reverse direction to release the pinched object.

Furthermore, the control unit 20 of the present embodiment executes a masking process of masking the unstable range, in which the rotational speed of the motor M becomes unstable immediately after starting of rotation of the motor M, to limit an occurrence of erroneous pinching determination in the process of determining whether the object is pinched by the window panel 3.

In order to achieve the above functions, the drive circuit 23 includes a determination circuit 23*b* and a setting circuit 23*c*. The determination circuit 23*b* executes the process of determining whether the object is pinched by the window panel 3 during the period of executing the opening/closing movement of the window panel 3. The setting circuit 23*c* sets a masking range to mask the unstable range and thereby to limit the occurrence of erroneous pinching determination.

When the microcomputer 24 receives the pulse signals, which are outputted from the pulse sensor 21, the determination circuit 23*b* is operated at the time of executing the process of determining whether the object is pinched by the window panel 3 based on the pulse signals. Specifically, in the present embodiment, the microcomputer 24 cooperates with the determination circuit 23*b* to function as a determination device, which executes the process of determining whether the object is pinched by the window panel 3 as follows. That is, the rotational speed of the motor M (the angular speed of the motor M) is computed based on the pulse signals. Then, the computed rotational speed of the motor M is compared with the threshold value, which is set for the pinching determination, to determine whether the pinching of the object with the window panel 3 exists.

The setting circuit 23*c* is operated at the time of setting the masking range for the pulse signals outputted in the unstable range, in which the rotational speed of the motor M becomes unstable, to eliminate the unstable range from the sensing range, in which the process of determining whether the object is pinched by the window panel 3 is executed based on the pulse signals outputted in the sensing range. That is, in the present embodiment, the microcomputer 24 and the setting circuit 23*c* cooperate together to function as a setting device, which sets the masking range.

After the setting of the masking range, the process of determining whether the object is pinched by the window panel 3 is executed in a remaining range that is other than the masking range during the opening/closing movement (more specifically, the closing movement in this instance) of the window panel 3. In other words, the microcomputer 24 controls the determination circuit 23*b* to execute the process of determining whether the object is pinched by the window panel 3 during the opening/closing movement of the window panel 3 based on the pulse signals outputted in the range other than the masking range.

Now, factors, which cause the unstable state of the rotational speed of the motor M, will be described.

The factors, which cause the unstable state of the rotational speed of the motor M, include (I) torsion in a rubber damper of a rotor of the motor M, (II) a play in meshed gears, such as a backlash between the meshed gears, (III) a change in a state of slackness of the wire 13 caused by a difference in a moving pattern of the window panel 3, (IV) a change in a physical property of grease caused by a change in the temperature and (V) a change in a size (dimension, such as a circumferential length) of the wire 13 caused by aging of the wire 13.

The first factor (I), i.e., the torsion in the rubber damper of the rotor of the motor M, is caused by generation of torsion in the rubber damper in response to the load in the rotational direction of the motor M at the time of starting the rotation of the motor M. The second factor (II), i.e., the play in the meshed gears, such as the backlash between the meshed gears, is the play in the meshed gears, such as the backlash between the meshed gears, which transmit the output of the motor M to the pulley 11. These factors cause the unstableness of the rotational speed of the motor M in a predetermined rotational angular range.

Figure 4A:
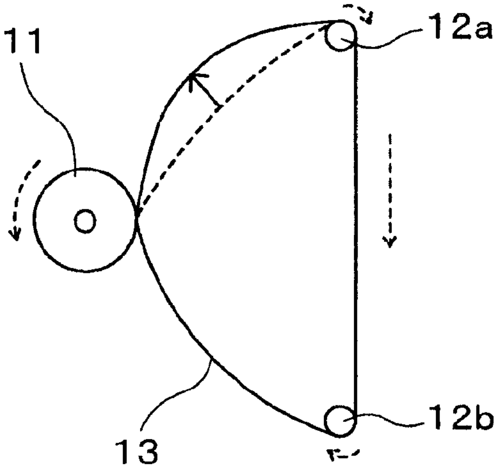
FIG. 4A is a diagram showing a state of a wire of the power window control apparatus during opening movement of a window panel, which serves as an openable and closable member and is installed to the door according to the embodiment.
Figure 4B:
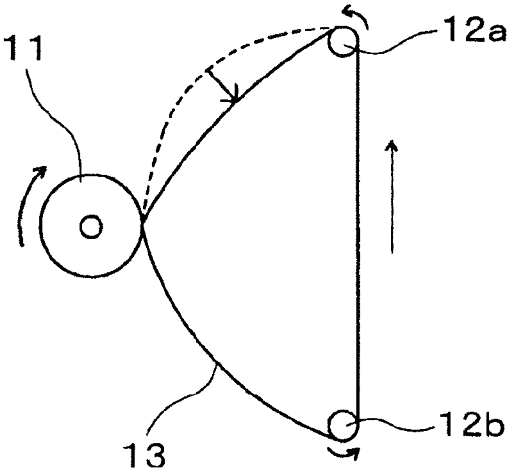
FIG. 4B is a diagram showing a state of the wire during closing movement of the window panel.

The third factor (III), i.e., the change in the state of slackness of the wire 13 caused by the difference in the moving pattern of the window panel 3 is caused by a change in a location of the slackness in the wire 13 that varies depending on the moving direction of the window panel 3 in the previous movement of the window panel 3. These factors will be more specifically described with reference to FIGS. 4A and 4B. FIG. 4A shows a state of the wire 13 during the opening movement of the window panel 3, and FIG. 4B shows a state of the wire 13 during the closing movement of the window panel 3.

In the opening movement of the window panel 3, the fixture member 3*a* (see FIG. 3), which is located between the driven-side rollers 12*a*, 12*b*, is moved downward. Therefore, a tensile stress is loaded on the wire 13 in the downward direction. As a result, as shown in FIG. 4A, the slackness of the wire 13 is present between the pulley 11 and the upper driven-side roller 12*a*. In the state of FIG. 4A where the slackness of the wire 13 is present at the location shown in FIG. 4A, when the window panels 3 makes the closing movement as indicated in FIG. 4B, the fixture member 3*a* is moved upward after removable (taking up) of the slackness of the wire 13 at the location between the pulley 11 and the upper driven-side roller 12*a*.

In contrast, in a moving pattern of closing after closing, in which the window panel 3 makes the closing movement once again after the execution of the closing movement thereof, the fixture member 3*a* is immediately moved upward without substantial lag time in the second closing movement of the window panel 3 due to the absence of the slackness of the wire 13 at the location between the pulley 11 and the upper driven-side roller 12*a*.

As discussed above, in the moving pattern of closing after opening, in which the window panel 3 makes the closing movement after the execution of the opening movement thereof, the unstable range of the rotational speed of the motor M is increased in comparison to the moving pattern of closing after closing, in which the window panel 3 makes the closing movement after the execution of the closing movement thereof.

The fourth factor (IV), i.e., the change in the physical property of the grease caused by the change in the temperature is caused by a change in a viscosity of the grease applied to the motor M and/or the gears in response to a change in the temperature. The viscosity of the grease largely depends on the temperature. Therefore, the unstable range of the rotational speed of the motor M caused by the change in the viscosity of the grease can be computed based on the temperature. The fifth factor (V), i.e., the change in the size of the wire 13 caused by the aging of the wire 13, is caused by elongation of the wire 13 due to a long term use thereof. When the amount of slackness of the wound wire 13 is increased, the unstable range of the rotational speed of the motor M is changed. The change in the size of the wire 13 largely varies depending on the service condition of the wire 13. Therefore, in general, it is difficult to compute the change in the size of the wire 13 as a function of time.

In order to appropriately execute the process of determining whether the object is pinched by the window panel 3, It is necessary to appropriately set the masking range, which is masked in the masking process, in view of the first to fifth factors (I)-(V) that cause the unstable state of the rotational speed of the motor M.

Therefore, according to the present embodiment, the masking range is set in view of a difference in the moving patterns of the window panel 3. That is, in the present embodiment, the masking range, which corresponds to the current moving pattern of the window panel 3, is set in view of the fact that the unstable range of the motor M immediately after the starting of rotation of the motor M varies depending on the moving pattern of the window panel 3.

Figure 5A:
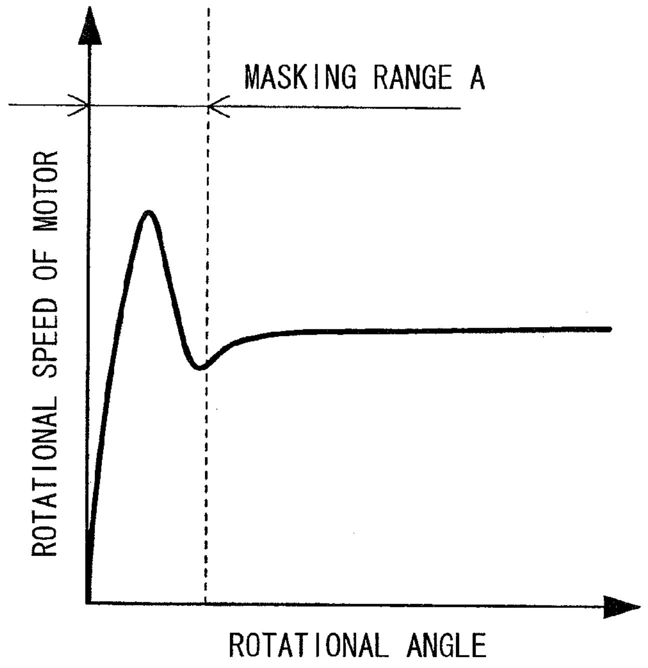
FIG. 5A is a diagram showing a relationship between a rotational angle of an electric motor and a rotational speed of the motor immediately after starting of rotation thereof in a moving pattern of closing after closing, in which the window panel makes the closing movement after execution of the closing movement thereof.

More specifically, in the moving pattern of closing after closing, in which the window panel 3 makes the closing movement (i.e., the upward movement of the window panel 3) after the execution of the closing movement thereof, the rotational speed of the motor M immediately after the starting of rotation thereof is unstable in an initial range (unstable range), in which the rotational speed of the motor M is temporarily increased, as shown in FIG. 5A. This is due to the fact that the load on the motor M becomes unstable because of the torsion of the rubber damper used in the rotor of the motor M and/or the play in the meshed gears, such as the backlash between the meshed gears. FIG. 5A is a diagram showing a relationship between the rotational angle of the motor M and the rotational speed of the motor M immediately after the starting of the rotation thereof in the moving pattern of closing after closing, in which the window panel 3 makes the closing movement after the execution of the closing movement thereof.

Therefore, in the above moving pattern of the window panel 3, i.e., the moving pattern of closing after closing, a masking range A, in which the process of determining whether the object is pinched by the window panel 3 is disabled, is set in the unstable range, in which the rotational speed of the motor M becomes unstable. Specifically, the number of pulse signals (the rotational angle of the motor M) generated in a period, during which the rotational speed of the motor M is unstable, is repeatedly counted, i.e., measured. Then, the maximum number of pulse signals is selected among the measured number of pulse signals. Thereafter, several pulses are added to this maximum number of pulse signals, and a range of the resultant number of pulse signals, which is obtained by the addition of the several pulses to the maximum number of pulse signals, is set as the masking range A.

Figure 5B:
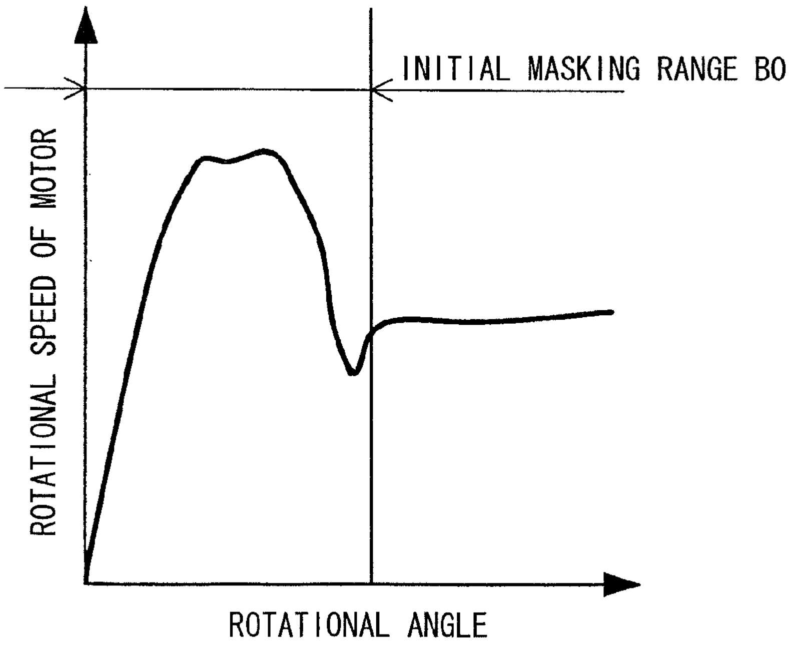
FIG. 5B is a diagram showing a relationship between the rotational angle of the motor and the rotational speed of the motor immediately after starting of rotation thereof in a moving pattern of closing after opening, in which the window panel makes the closing movement after execution of the opening movement thereof.

In contrast, as shown in FIG. 5B, in the moving pattern of closing after opening, in which the window panel 3 makes the closing movement after the execution of the opening movement thereof (i.e., the downward movement of the window panel 3), an unstable range, in which the rotational speed of the motor M is temporarily increased immediately after the starting of rotation thereof, is increased, i.e., widened in comparison to that of FIG. 5A. This is due to an increase (widening) of a loadless range, in which the load is not substantially applied to the motor M due to the presence of the slackness of the wire 13 that is generated by the closing movement of the window panel 3 after the execution of the opening movement thereof. FIG. 5B is a diagram showing a relationship between the rotational angle of the motor M and the rotational speed of the motor M immediately after the starting of rotation thereof in the moving pattern of closing after opening, in which the window panel 3 makes the closing movement after the execution of the opening movement thereof.

Therefore, in the above moving pattern of the window panel 3, i.e., the moving pattern of closing after opening, the number of pulse signals (the rotational angle of the motor M) generated in the period, during which the rotational speed of the motor M is unstable, is repeatedly counted, i.e., measured. Then, the maximum number of pulse signals is selected among the measured number of pulse signals. Thereafter, several pulses are added to this maximum number of pulse signals, and a range of the resultant number of pulse signals, which is obtained by the addition of the several pulses to the maximum number of pulse signals, is set as an initial masking range B0.

In a case where the unstable range of the rotational speed of the motor M is changed due to a change in the temperature, the masking range A and the initial masking range B0 discussed above may be corrected by the amount, which corresponds to the amount of change in the unstable range of the rotational speed of the motor M, if desired. For instance, a correction value may be computed based on a measurement value of a temperature sensor (not shown), and this correction value may be added to or subtracted from the number of pulse signals generated in the period, during which the rotational speed of the motor M becomes unstable.

The masking range A and the initial masking range B0 can be set according to the moving pattern of the window panel 3 through the above-described procedure. However, in some cases, the appropriate masking range cannot be set by simply setting the masking range according to the moving pattern of the window panel 3. Specifically, the wire 13 of the present embodiment has the flexibility, so that the size of the wire 13 may change due to a long term use. Thus, the appropriate masking range may change in response to the change in the size of the wire 13. That is, in view of the elongation of the wire 13 caused by the aging thereof, resetting of the masking range is required.

Now, a method of setting the masking range in view of the elongation of the wire 13 caused by the aging thereof will be described.

Figure 6A:
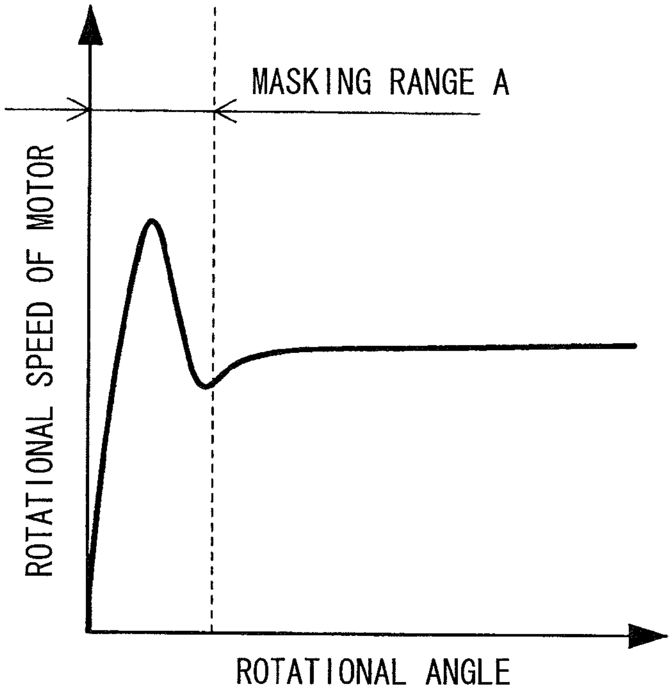
FIG. 6A is a diagram showing a relationship (state after aging) between the rotational angle of the motor and the rotational speed of the motor immediately after starting of rotation thereof in the moving pattern of closing after closing, in which the window panel makes the closing movement after execution of the closing movement thereof, according to the embodiment.
Figure 6B:
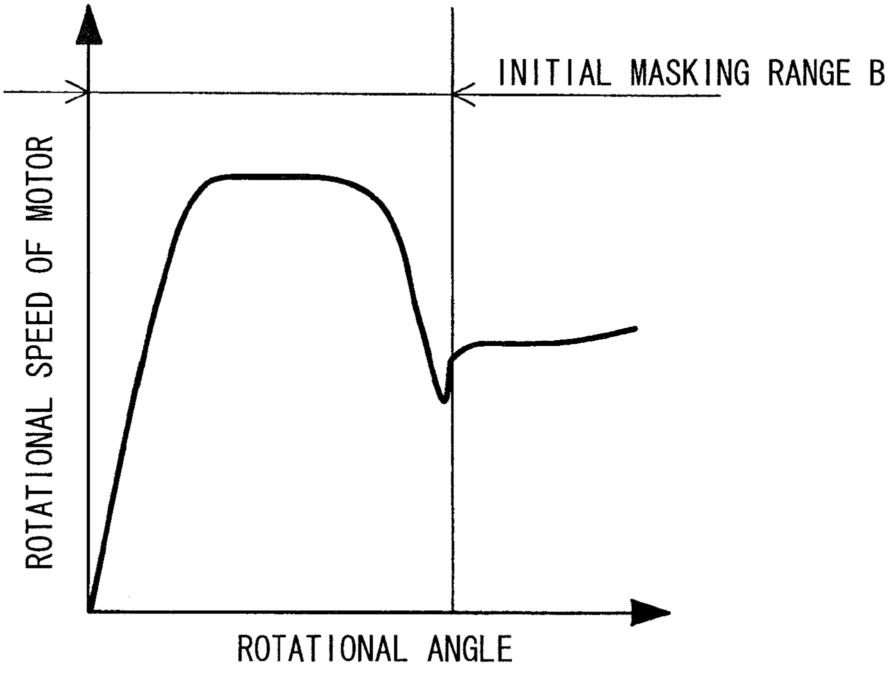
FIG. 6B is a diagram showing a relationship between the rotational angle of the motor and the rotational speed of the motor immediately after starting of rotation thereof in the moving pattern of closing after opening, in which the window panel makes the closing movement after execution of the opening movement thereof, according to the embodiment.

When the wire 13 is elongated due to the aging thereof, the relationship between the rotational angle of the motor M and the rotational speed of the motor M immediately after the starting of the rotation of the motor M will become one shown in FIG. 6A or FIG. 6B. FIG. 6A is a diagram showing a corresponding relationship between the rotational angle and the rotational speed of the motor M immediately after starting of rotation of the motor M measured by using the wire 13, which is elongated due to the aging thereof, in the moving pattern of closing after closing, in which the window panel 3 makes the closing movement after the execution of the closing movement thereof. FIG. 6B is a diagram showing a corresponding relationship between the rotational angle and the rotational speed of the motor M immediately after starting of rotation of the motor M measured by using the wire 13, which is elongated due to the aging thereof, in the moving pattern of closing after opening, in which the window panel 3 makes the closing movement after the execution of the opening movement thereof.

In the case where the wire 13 is elongated due to the aging thereof, at the time of executing the moving pattern of closing after closing, in which the window panel 3 makes the closing movement after the execution of the closing movement thereof, there is no slackness in the wire 13 at the location between the pulley 11 and the upper driven-side roller 12*a* since the previous movement of the window panel 3 is the closing movement. Therefore, the relationship between the rotational angle and the rotational speed of the motor M shown in FIG. 6A is similar to the case where the wire 13 is new and is thereby not aged. Therefore, the masking range, which is the same as the masking range A set at the time of using the wire 13 in the initial state (new state), can be used for the process of determining whether the object is pinched by the window panel 3.

In contrast, in the case of the moving pattern of closing after opening shown in FIG. 6B, in which the window panel 3 makes the closing movement after execution of the opening movement thereof, an unstable range, in which the rotational speed of the motor M is temporarily increased, i.e., is temporarily widened even in comparison to FIG. 5B. This is due to the increase in the amount of slackness of the wire 13 between the pulley 11 and the upper driven-side roller 12*a* caused by the elongation of the wire 13 by the aging thereof.

In order to counteract with the slackness of the wire 13, in general, the amount of increase in the unstable range of the rotational speed of the motor M is set as the amount of change ΔD, and the masking range B for the elongated state (aged state) of the wire 13 is computed by the following equation (1).

$$B=B0+\Delta D \quad \text{Equation (1)}$$

In the equation (1), the amount of change ΔD is computed as follows. That is, the number of pulse signals outputted from the motor M at the time of moving the window panel 3 from the full open position to the full close position thereof is measured by using each of the wire 13 in the initial state (new state) and the wire 13 in the aged state (elongated state). Then, the number of pulse signals measured by using the wire 13 in the initial state is compared with the number of pulse singles measured by using the wire 13 in the aged state to obtain the amount of change ΔD. Specifically, the number of pulse signals, which are counted from the full open position to the full close position of the window panel 3 by using the wire 13 in the initial state (new state), is defined as an initial rotational angle D0 (initial value) and is stored in the memory 24*b* of the microcomputer 24. Furthermore, the number of pulse signals, which are counted from the full open position to the full close position of the window panel 3 by using the wire 13 in the aged state (elongated state), is defined as a rotational angle D1. Then, the amount of change ΔD is computed as a difference between the rotational angle D1 and the initial rotational angle D0.

As discussed above, the amount of change ΔD is computed based on the number of pulse signals counted from the full open position to the full close position of the window panel 3 by using the wire 13 in the initial state and the number of pulse signals counted from the full open position to the full close position of the window panel 3 by using the wire 13 in the aged state. In this way, even in the moving pattern of closing after opening, in which the window panel 3 makes the closing movement after the execution of the opening movement thereof, using the wire 13 in the aged state, the appropriate masking range B can be reset by adding the amount of change ΔD to the initial masking range B0.

However, in the case of the above procedure, the amount of change ΔD is not computed unless the window panel 3 is moved from the full open position to the full close position. Therefore, unless the window panel 3 is moved from the full open position to the full close position, the resetting of the masking range is not performed. That is, depending on the moving pattern of the window panel 3 (e.g., a case where the window panel 3 is repeatedly stopped in the middle of the movable range of the window panel 3 between the full open position and the full close position), the appropriate masking range may not be reset even though the wire 13 is elongated due to the aging thereof. Therefore, when the wire 13 is used for a long period of time, the masking range may possibly be deviated from an appropriate range thereof, and thereby the presence/absence of the pinched object may not be appropriately determined in the process of determining whether the object is pinched by the window panel 3.

In view of the above point, according to the present embodiment, the masking range is reset in view of an execution history of the opening/closing movements of the window panel 3 without a need for moving the window panel 3 from the full open position to the full close position. Therefore, the drive circuit 23 includes a computing circuit 23*d* in addition to the determination circuit 23*b* and the setting circuit 23*c*. The computing circuit 23*d* computes an index value for the execution history of the opening/closing movement of the window panel 3.

The computing circuit 23*d* is operated at the time of computing the index value for the execution history of the opening/closing movement of the window panel 3 based on the signals received from the pulse sensor 21 and the switch SW or the battery Ba or the counter 25. Specifically, according to the present embodiment, the microcomputer 24 and the computing circuit 23*d* cooperate with each other to serve as a computing device that computes the above-described index value. The computed index value is stored in the memory 24*b* of the microcomputer 24.

The index value for the execution history of the opening/closing movement of the window panel 3 refers to a value, which changes in response to each execution of the opening/closing movement of the window panel 3 and is a cumulative value that is cumulated upon each execution of opening/closing movement of the window panel 3. For instance, the index value may be the total number of executions of the opening/closing movement of the window panel 3, a sum of moved distances of the window panel 3 in the opening/closing movements of the window panel 3 executed heretofore, or the total number of times of reaching of the window panel 3 to a reference position set in the movable range of the window panel 3.

In the present embodiment, the masking range is set according to the above index value. Specifically, in the case of setting the masking range B for the moving pattern of closing after opening, in which the window panel 3 makes the closing movement after execution of the opening movement thereof, the index value stored in the memory 24*b* is retrieved, and the setting circuit 23*c* is operated such that the appropriate masking range B is set based on the index value.

Now, in order to ease understanding of a flow of the operation up to the setting of the masking range, an example (first example) will be described. In this example, the masking range is set based on the number of executions of the opening/closing movement in a case where the closing switch is manipulated to supply a closing command signal, which commands the closing movement of the window panel 3.

Figures 7, 8:
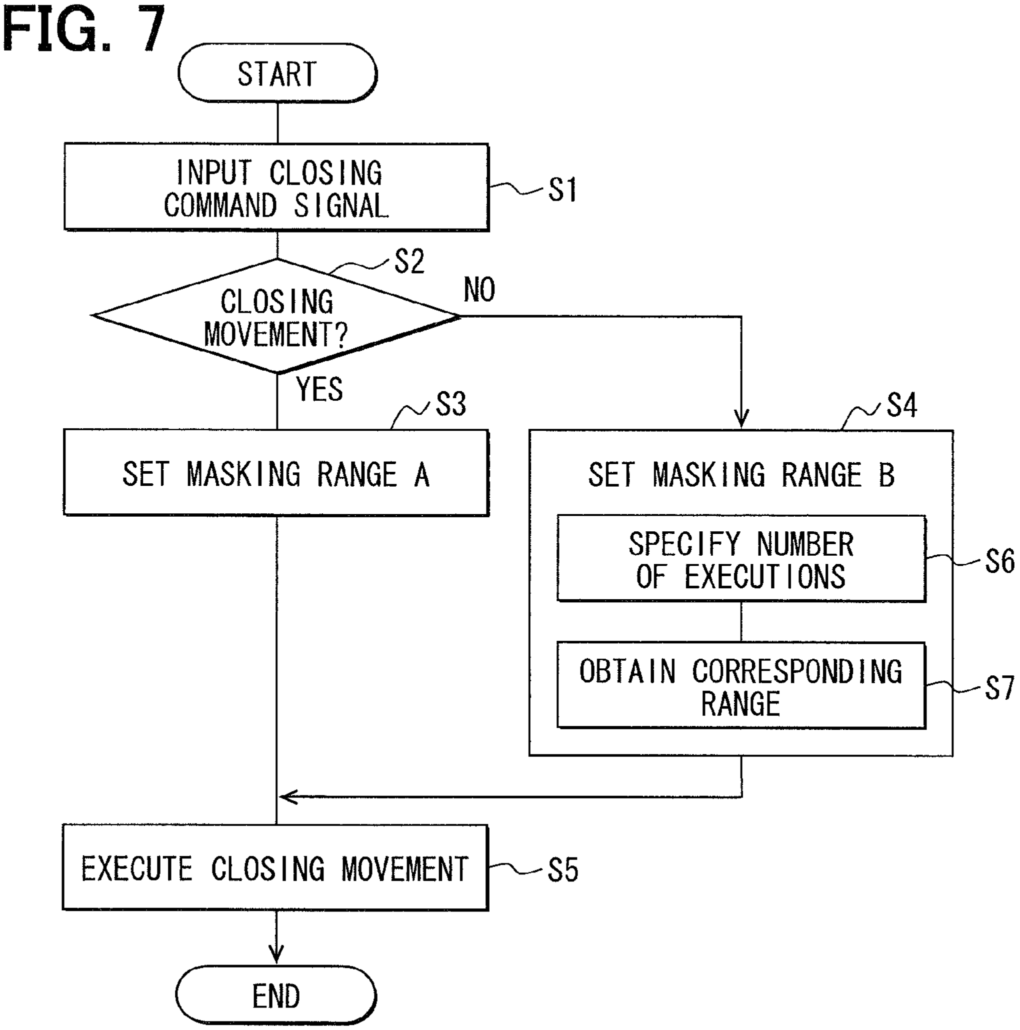
FIG. 7 is a flowchart indicating a first example of a control operation for controlling opening/closing movement of the window panel according to the embodiment.
FIG. 8 is a diagram showing a relationship between the number of executions of the opening/closing movement of the window panel and a masking range according to the embodiment.

The operation of the first example is executed according to a flowchart shown in FIG. 7. FIG. 7 is the flowchart indicating the first example of the control operation for controlling the opening/closing movement of the window panel according to the present embodiment.

First of all, the closing command signal is inputted, i.e., received upon manipulation of the closing switch by the user at step S1. Then, the operation proceeds to step S2 where it is determined whether the previous movement of the window panel 3 is the closing movement. When the previous movement of the window panel 3 is the closing movement (YES at step S2), the masking range A is set as the masking range at step S3. In contrast, when the previous movement of the window panel 3 is the opening movement (NO at step S2), the masking range B is set as the masking range at step S4. When the masking range is set at step S3 or step S4, the operation proceeds to step S5 where the closing movement of the window panel 3 is executed. The pinching determination process of determining whether the object is pinched by the window panel 3 is executed based on the pulse signals, which are outputted upon the setting of the masking range.

That is, in the case where the previous movement of the window panel 3 is the closing movement, the process of determining whether the object is pinched by the window panel 3 is not executed unit the motor M is rotated through the rotational angle, which corresponds to the number of pulse signals set for the masking range A after the starting of the closing movement of the window panel 3. In contrast, in the case where the previous movement of the window panel 3 is the opening movement, the process of determining whether the object is pinched by the window panel 3 is not executed unit the motor M is rotated through the rotational angle, which corresponds to the number of pulse signals set for the masking range B after the starting of the closing movement of the window panel 3. As discussed above, the appropriate masking range, in which the process of determining whether the object is pinched by the window panel 3 is disabled, is appropriately set in the unstable range, in which the rotational speed of the motor M becomes unstable, so that the occurrence of erroneous pinching determination is advantageously limited.

Next, the process of setting the masking range B will be described with reference to FIG. 7. At the time of setting the masking range B, the microcomputer 24 operates the computing circuit 23*d* based on the signals received from the counter 25, so that the total number of executions of the opening/closing movement of the window panel 3 is specified at step S6. Here, the total number of executions of the opening/closing movement of the window panel 3 may be the total number of executions of the opening/closing movement of the window panel 3 since the time of shipping the vehicle 1 from the factory or since the time of executing a maintenance work of the vehicle (e.g., time of replacing the wire 13) at a service station.

Thereafter, according to a relationship between the total number of executions of the opening/closing movement of the window panel 3 and the masking range shown in FIG. 8, the range, which corresponds to the specified total number of executions, is obtained and is set as the masking range B at step S7. FIG. 8 is the diagram (table) indicating the relationship between the total number of executions of the opening/closing movement of the window panel 3 and the masking range. The width (length) of the masking range is increased in the order of the masking ranges B1, B2, B3, B4 in FIG. 8. For example, when the total number of executions of the opening/closing movement of the window panel 3 is 150 times, the masking range B2 of FIG. 8 is set as the masking range B. The above relationship (table) is prestored in the memory 24*b* of the microcomputer 24 and is retrieved from the memory 24*b* at the time of operating the setting circuit 23*c*.

The relationship between the number of executions of the opening/closing movement of the window panel 3 and the masking range will now be described in detail. In the present embodiment, as shown in FIG. 8, the masking range is widened, i.e., lengthened stepwise by a predetermined amount at every predetermined number of executions of the opening/closing movement of the window panel 3 (100 times in the case of FIG. 8). Specifically, in the present embodiment, an upper limit value of the masking range is increased stepwise by the predetermined amount upon every predetermined number of executions of the opening/closing movement of the window panel 3. However, the present disclosure is not limited to this. For instance, the number of executions of the opening/closing movement of the window panel 3, which is required to increase the masking range, i.e., to change the masking range from one to another, is not necessarily fixed to the predetermined number (100 times in the case of FIG. 8). In other words, the masking range may be increased at a predetermined desired number of executions of the opening/closing movement of the window panel 3. Furthermore, the amount of increase of the masking range for every predetermined number of executions of the opening/closing movement of the window panel 3 may be varied (i.e., not required to be constant).

Figure 9A:
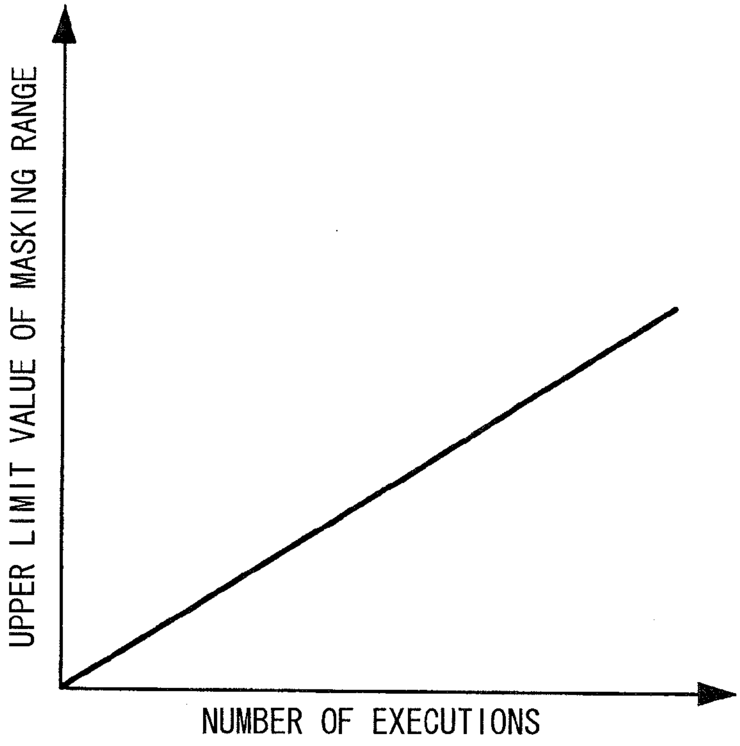
FIGS. 9A and 9B are diagrams showing modifications of the relationship between the total number of executions of the opening/closing movement of the window panel and the masking range of the embodiment.
Figure 9B:
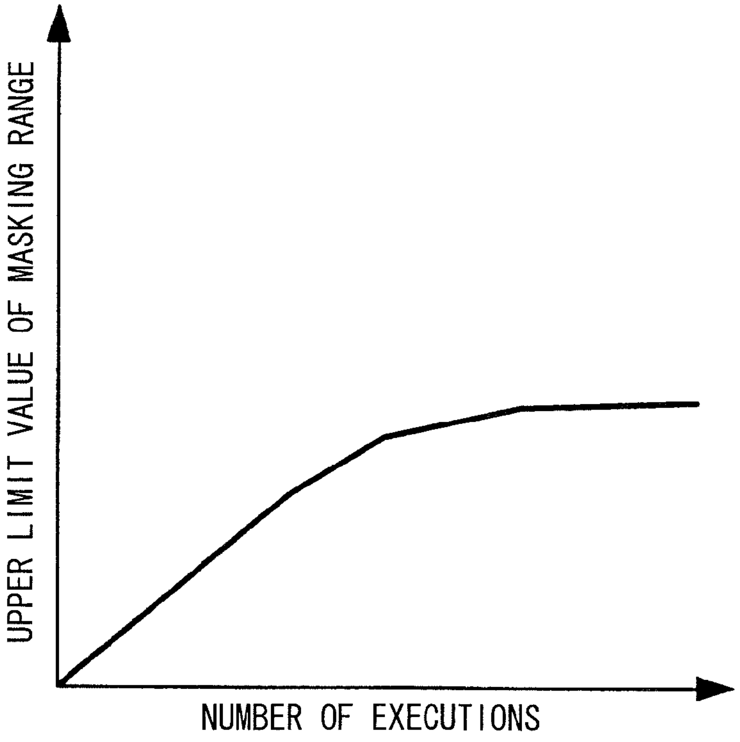

Furthermore, the relationship between the total number of executions of the opening/closing movement of the window panel 3 and the masking range may be expressed by a function using the total number of executions of the opening/closing movement of the window panel 3 as a variable for obtaining the corresponding masking range (the corresponding upper limit value of the masking range), as indicated in FIG. 9A or 9B. In such a case, the masking range B can be set more finely. FIGS. 9A and 9B are diagrams showing modifications of the relationship between the total number of executions of the opening/closing movement of the window panel and the masking range of the embodiment.

When the masking range B is set based on the index value for the execution history of the opening/closing movements of the window panel 3 in the above-described manner, the masking range B can be appropriately reset according to the present embodiment based on the index value without requiring the execution of the movement of the window panel 3 from the full open position to the full close position. Thereby, it is possible to eliminate the occurrence of the disadvantageous incidence of that the appropriate masking range is not reset even though the wire 13 is elongated by the aging thereof.

Furthermore, in the power window control apparatus (serving as the openable and closable member control apparatus) 4 of the present embodiment, it is not required to install the automatic tensioner mechanism. Therefore, an increase in the number of components and an increase in the costs can be advantageously limited. Furthermore, since the masking range B is automatically set in response to the movement of the window panel 3, any dedicated manipulation or operation of the user is not required at the time of renewing the masking range B, so that the appropriate masking range B can be renewed under the normal operational condition.

In the present embodiment, the relationship between the index value for the execution history of the opening/closing movements of the window panel 3 and the masking range is stored in the memory 24*b*. Then, at the time of setting the masking range B, this relationship is retrieved from the memory 24*b*. Then, the masking range B is set based on the obtained index value and the above relationship. In this way, the setting of the masking range is eased. That is, the masking range, which corresponds to the obtained index value, is obtained based on the above relationship, and this obtained masking range is used as the masking range B. Thereby, the setting of the masking range B is eased.

In the above example (the first example), the total number of executions of the opening/closing movement of the window panel 3 is used as the index value for the execution history of the opening/closing movements of the window panel 3. However, the index value of the present disclosure is not limited to this. For instance, a sum of moved distances of the window panel 3 executed heretofore may be used as the index value. Furthermore, the total number of times of reaching of the window panel 3 to a reference position set in the movable range (moving path) of the window panel 3 may be used as the index value. These index values can be obtained based on the pulse signals supplied from the pulse sensor 21.

Particularly, in the case where the total number of times of reaching of the window panel 3 to the reference position set in the movable range of the window panel 3 is obtained as the index value, this reference position is preferably be an end position (an upper end position or a lower end position) of the movable range of the window panel 3. In this way, the reference position becomes definite, and thereby it is easy to obtain the total number of times of reaching of the window panel 3 to the reference position.

Furthermore, the index value is not limited to one. That is, it is possible to use the multiple index values (e.g., the total number of executions of the opening/closing movement of the window panel 3, the sum of moved distances of the window panel 3 in the opening/closing movements of the window panel 3 executed heretofore, and the total number of times of reaching of the window panel 3 to the reference position set in the movable range of the window panel 3). Specifically, at least one of the above three values may be obtained as the index value. Thereby, the multiple values may be obtained and used for setting the masking range B.

Now, modifications of the above embodiment will be described.

In the above embodiment, the openable and closable member control apparatus and the vehicle having the same according to the present disclosure are mainly discussed. However, the above embodiment is provided to ease the understanding of the present disclosure and should not limit the scope of the present disclosure. The present disclosure may be modified within the scope and spirit of the present disclosure.

In the above embodiment, the window panel 3 is discussed as the example of the openable and closable member. However, the openable and closable member of the present disclosure is not limited to the window panel 3. Alternative to the window panel 3, the openable and closable member of the present disclosure may be used in, for example, a movable floor of the vehicle, a vehicle hinged door, a vehicle slide door, a vehicle flap door, a vehicle movable step, a vehicle sunroof panel, a vehicle trunk lid, a seat surface of a slidable and height adjustable vehicle seat, a seat back of a reclining vehicle seat, a tiltable and telescopic vehicle steering wheel, a foldable vehicle door mirror, a movable vehicle air spoiler or an retractable roof of a convertible vehicle.

Furthermore, in the above embodiment, the wire 13 is discussed as the example of the flexible drive member. However, the flexible drive member of the present disclosure is not limited to the wire 13. That is, the flexible drive member of the present disclosure may be a drive force transmitting member having flexibility, such as a band member (e.g., a belt).

Furthermore, in the above embodiment, the process of determining whether the object is pinched is executed at the time of executing the closing movement of the openable and closable member. Alternatively, the process of determining whether the object is pinched may be executed at the time of executing the opening movement of the openable and closable member. Further alternatively, the process of determining whether the object is pinched may be executed at the time of executing each of the closing movement and opening movement of the openable and closable member.

What is claimed is:

1. An openable and closable member control apparatus comprising:

a flexible drive member that is engaged with an openable and closable member and drives the openable and closable member to open or close through an opening/closing movement of the openable and closable member;

an electric motor that applies a drive force to the flexible drive member;

a sensing device that outputs signals one after another in response to a change in a rotational state of the electric motor, which is sensed by the sensing device;

a computing device that computes at least one index value for an execution history of the opening/closing movement of the openable and closable member, wherein when a total amount of the opening/closing movement of the openable and closable member is increased, the computing device increases the at least one index value regardless of whether the opening/closing movement of the openable and closable member is an opening movement or a closing movement;

a setting device that sets a masking range for at least one of the signals based on the at least one index value, wherein the setting device increases the masking range when the at least one index value is increased; and a determination device that determines whether an object is pinched by the openable and closable member based on at least another one of the signals, which is outputted in a range other than the masking range, without referring to the at least one of the signals in the masking range during execution of the opening/closing movement of the openable and closable member.

2. The openable and closable member control apparatus according to claim 1, wherein the computing device computes at least one of the followings as the at least one index value:

a number of executions of the opening/closing movement of the openable and closable member;

a sum of moved distances of the openable and closable member; and a total number of times of reaching of the openable and closable member to a reference position set in a moving path of the openable and closable member.

3. The openable and closable member control apparatus according to claim 2, wherein the reference position is an end position in the moving path of the openable and closable member.

4. The openable and closable member control apparatus according to claim 1, further comprising a storage device that stores a relationship between the at least one index value and the masking range, wherein the setting device sets the masking range based on the at least one index value computed by the computing device and the relationship.

5. The openable and closable member control apparatus according to claim 1, wherein:

the flexible drive member is a wire;

a rotatable roller is coupled with the wire and is rotatable in a state where the wire is wound around an outer peripheral surface of the rotatable roller;

the electric motor applies the drive force to the wire by rotating the rotatable roller;

the sensing device outputs the signals, which correspond to an angular speed of the electric motor; and the setting device sets the masking range based on the at least one index value at the time of executing the opening/closing movement of the openable and closable member.

6. A vehicle comprising:

a vehicle main body;

an openable and closable member that is installed to the vehicle main body and is openable and closable through an opening/closing movement of the openable and closable member; and an openable and closable member control apparatus that controls the opening/closing movement of the openable and closable member, wherein the openable and closable member control apparatus includes:

a flexible drive member that is engaged with the openable and closable member and drives the openable and closable member to open or close upon the opening/closing movement of the openable and closable member;

an electric motor that applies a drive force to the flexible drive member;

a sensing device that outputs signals one after another in response to a change in a rotational state of the electric motor, which is sensed by the sensing device;

a computing device that computes at least one index value for an execution history of the opening/closing movement of the openable and closable member, wherein when a total amount of the opening/closing movement of the openable and closable member is increased, the computing device increases the at least one index value regardless of whether the opening/closing movement of the openable and closable member is an opening movement or a closing movement;

a setting device that sets a masking range for at least one of the signals based on the at least one index value, wherein the setting device increases the masking range when the at least one index value is increased; and a determination device that determines whether an object is pinched by the openable and closable member based on at least another one of the signals, which is outputted in a range other than the masking range, without referring to the at least one of the signals in the masking range during execution of the opening/closing movement of the openable and closable member.

* * * * *